United States Patent
Kano et al.

(10) Patent No.: US 9,301,583 B2
(45) Date of Patent: Apr. 5, 2016

(54) STORAGE CONTAINER (71) Applicant: Brother Kogyo Kabushiki Kaisha, Nagoya-shi, Aichi-ken (JP)

(72) Inventors: Yasutoshi Kano, Kariya (JP); Kazuma Hojo, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 70 days.

(21) Appl. No.: 14/224,389

(22) Filed: Mar. 25, 2014

(65) Prior Publication Data

US 2014/0293521 A1  Oct. 2, 2014

(30) Foreign Application Priority Data

Mar. 28, 2013 (JP) ................. 2013-070488

(51) Int. Cl.
| | |
|---|---|
| H05K 5/02 | (2006.01) |
| A45C 11/00 | (2006.01) |
| H05K 5/00 | (2006.01) |
| B41J 3/36 | (2006.01) |
| B41J 29/02 | (2006.01) |
| H01M 2/10 | (2006.01) |

(52) U.S. Cl.
CPC . *A45C 11/00* (2013.01); *B41J 3/36* (2013.01); *B41J 29/02* (2013.01); *H05K 5/0017* (2013.01); *H01M 2/1022* (2013.01); *H01M 2/1055* (2013.01)

(58) Field of Classification Search
CPC .............. A45C 11/00; B41J 29/02; B41J 3/36
USPC .................................. 361/679.01
See application file for complete search history.

(56) References Cited

U.S. PATENT DOCUMENTS

| | | | | |
|---|---|---|---|---|
| 5,665,485 A | * | 9/1997 | Kuwayama | H01M 2/1055 174/564 |
| 5,848,152 A | * | 12/1998 | Slipy | H04M 1/0216 379/433.1 |
| 6,594,472 B1 | * | 7/2003 | Curtis | H04M 1/0283 379/428.01 |
| 2002/0193136 A1 | * | 12/2002 | Halkosaari | H04M 1/18 455/550.1 |
| 2004/0089570 A1 | * | 5/2004 | Chien | H04M 1/18 206/320 |
| 2007/0097014 A1 | * | 5/2007 | Solomon et al. | 345/1.1 |

FOREIGN PATENT DOCUMENTS

| | | |
|---|---|---|
| JP | H09-018169 A | 1/1997 |
| JP | 2003-288868 A | 10/2003 |
| JP | 2007-312255 A | 11/2007 |

* cited by examiner

*Primary Examiner* — Tuan T Dinh
*Assistant Examiner* — Rockshana Chowdhury
(74) *Attorney, Agent, or Firm* — Banner & Witcoff, Ltd.

(57) ABSTRACT

A storage container includes a main body and a cover. The main body includes a first recessed portion and an outer edge portion. The first recessed portion has an opening portion and is bounded by a first bottom surface portion and a first peripheral wall portion including a first wall portion. The outer edge portion protrudes further than the first wall portion on an outer periphery side of the storage container with respect to the first wall portion. The first wall portion has a groove portion and at least one first hole portion. The groove portion is formed on a protruding end portion of the first wall portion in a position separated from an edge of the first recessed portion toward the outer edge portion. The at least one hole portion opens onto the protruding end portion, communicates with the groove portion and is separated from the first recessed portion.

7 Claims, 7 Drawing Sheets

STORAGE CONTAINER

CROSS-REFERENCE TO RELATED APPLICATION

This application claims priority to Japanese Patent Application No. 2013-070488 filed on Mar. 28, 2013, the disclosure of which is herein incorporated by reference in its entirety.

BACKGROUND

The present disclosure relates to a storage container that has a splash-proof structure.

A storage container that includes a main body and a lid is used for various applications. The main body has a recessed portion that is configured to store goods. The lid fits with the main body and closes an opening portion of the recessed portion. A storage container is known that includes a splash-proof structure, in order to inhibit liquid from entering into a recessed portion of a main body when the liquid falls onto the main body etc. In particular, in electronic instruments, the splash-proof structure is generally provided on storage portions of electronic components.

A general splash-proof construction is a structure in which packing is arranged in the gap between the opening portion and the lid. The packing is formed of an elastic body. For example, a structure is known that inhibits liquid from entering into a battery storage recess by an elastic ring and a stepped portion. In this structure, the elastic ring is provided around an outer perimeter surface of a battery pack that is fitted into the battery storage recess. The stepped portion is provided around the whole perimeter of an inner wall surface of the battery storage recess.

SUMMARY

As represented by the above-described structure, when the packing that is a separate component to the storage container is provided on the main body or on the lid of the storage container, the number of components of the storage container increases. Component costs thus increase.

Various exemplary embodiments of the general principles described herein provide a storage container that has a splash-proof structure that is simple and that is configured to inhibit liquid from entering into a recessed portion that is used for storage without increasing a number of components.

Various exemplary embodiments herein provide a storage container that includes a main body and a cover. The main body has a first recessed portion and an outer edge portion. The first recessed portion has an opening portion and is bounded by a first bottom surface portion and a first peripheral wall portion. The first peripheral wall portion includes a first wall portion. The outer edge portion protrudes further than the first wall portion on an outer periphery side of the storage container with respect to the first wall portion, and has an inner surface that extends in a height direction of the first wall portion. The first wall portion has a groove portion and at least one first hole portion. The groove portion is formed on a protruding end portion of the first wall portion in a position that is separated from an edge of the first recessed portion toward the outer edge portion in a thickness direction of the first wall portion. The at least one hole portion opens onto the protruding end portion, communicates with the groove portion and is provided in a position that is separated from the first recessed portion. The cover is configured to be removably attached to the main body, and is configured to close the opening portion of the first recessed portion in a state in which a portion of an outer peripheral surface of the cover comes into contact with the inner surface of the outer edge portion of the main body.

BRIEF DESCRIPTION OF THE DRAWINGS

Embodiments will be described below in detail with reference to the accompanying drawings in which.

DETAILED DESCRIPTION

Figure 1:
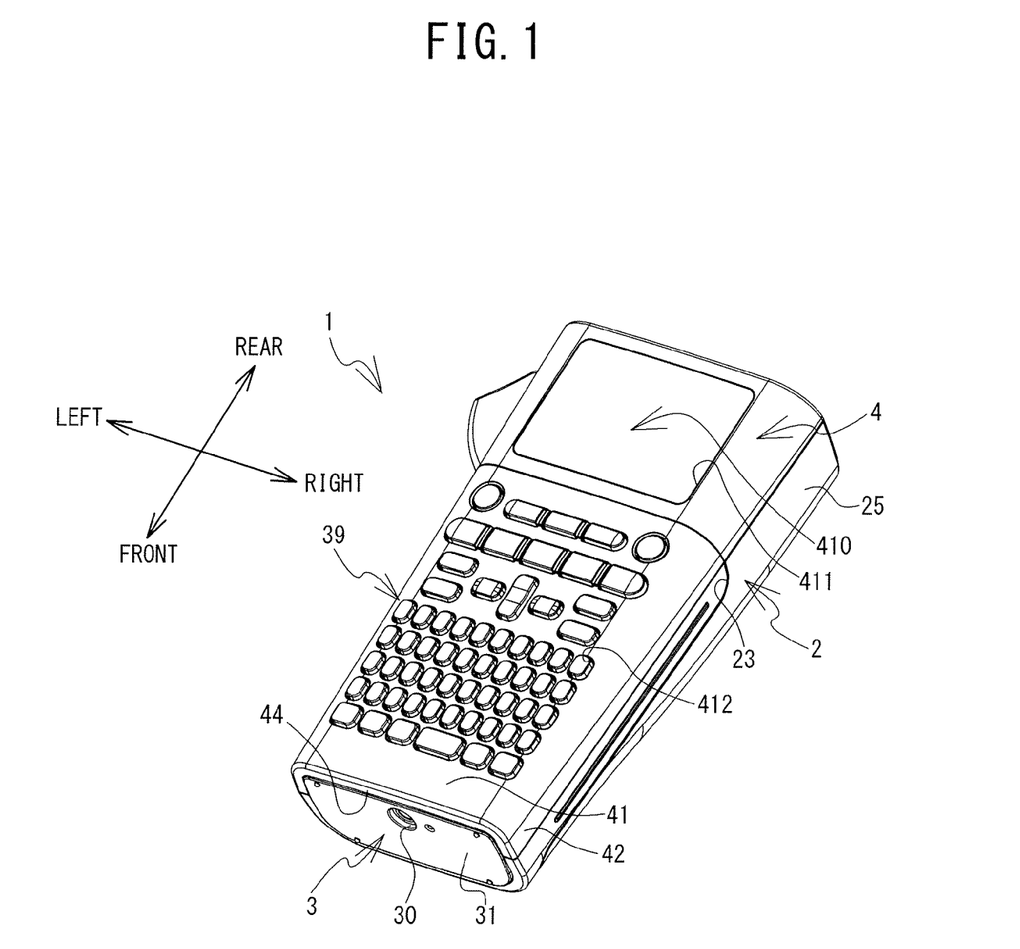
FIG. 1 is a perspective view of a printer as seen from above.
Figure 4:
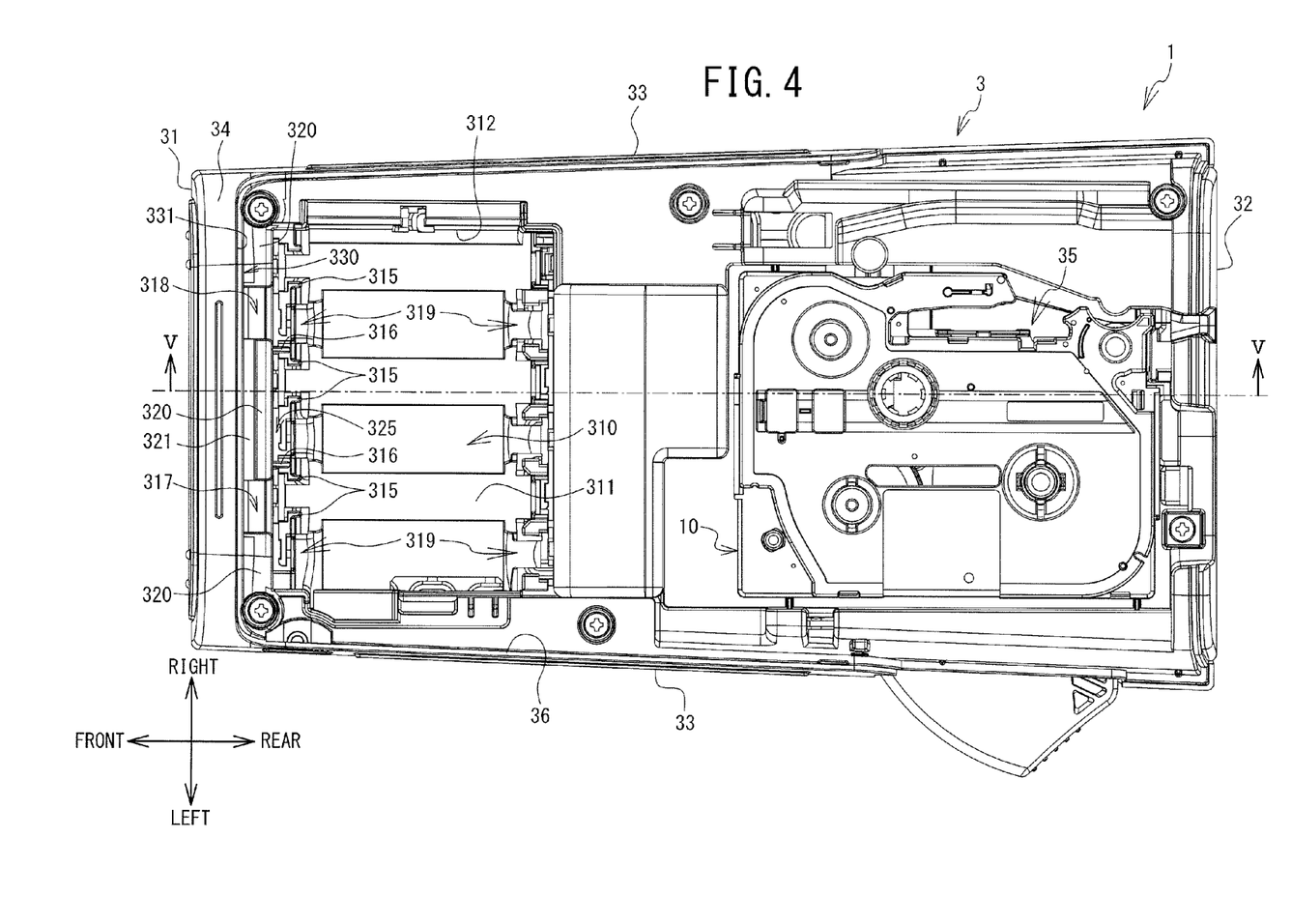
FIG. 4 is a bottom view of the printer, with the cassette cover removed.

Hereinafter, an embodiment will be explained with reference to the drawings. The upper left side, the lower right side, the lower left side and the upper right side of FIG. 1 are, respectively, the left side, the right side, the front side and the rear side of a printer 1. The front surface side, the rear surface side of FIG. 4 are, respectively, the lower side and the upper side of the printer 1. However, the left-right direction and the up-down direction of the printer 1 are defined for explanation purposes in each case and the printer 1 is not always in a posture in which the upper side faces upward (hereinafter referred to as an upward facing posture) as shown in FIG. 1.

Figure 2:
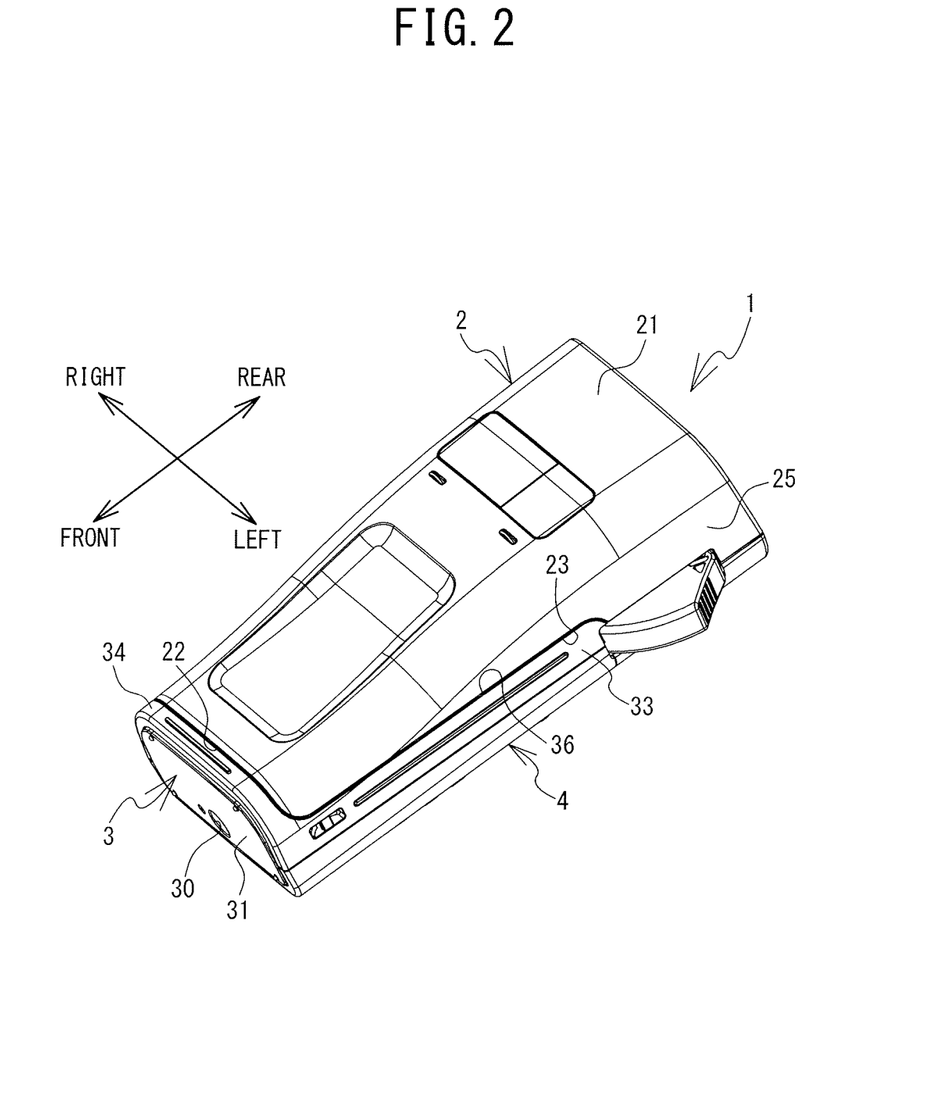
FIG. 2 is a perspective view of the printer as seen from below.

First, an overall structure of the printer 1 of the present embodiment will be explained. The printer 1 of the present embodiment is a portable tape printer that is configured to perform printing on a tape that is pulled out from a tape cassette 10 (refer to FIG. 3). As shown in FIG. 1 and FIG. 2, as a whole, the printer 1 has a substantially cuboid shape that becomes slightly larger in the left-right direction and up-down direction toward the rear. The printer 1 includes a display portion 410 and an operation portion 39 that includes a plurality of keys on an upper surface. A user may input characters to be printed on the tape (letters, numerals, symbols and graphics etc.) and to input various operating commands etc., using the operation portion 39. The characters to be printed and messages etc. may be displayed on the display portion 410.

A housing of the printer 1 includes a main body 3, a top cover 4 that is disposed on the upper side of the main body 3, and a cassette cover 2 that is disposed on the lower side of the main body 3. Hereinafter, the structures of the cassette cover 2, the main body 3 and the top cover 4 will be explained in order. Note that FIG. 3, FIG. 4, FIG. 5 and FIG. 7 show the printer 1 in a posture in which the lower side of the printer 1 is facing upward (hereinafter referred to as a downward facing posture), with the cassette cover 2 removed.

As shown in FIG. 2, the cassette cover 2 is a thin plate-shaped member and includes a bottom plate portion 21 and a pair of side plate portions 25. The bottom plate portion 21 is a substantially rectangular shape that is longer in the front-rear direction. The side plate portions 25 extend upward (to the side of the main body 3) from the right and left end portions of the bottom plate portion 21, respectively, and are slightly curved. The side plate portions 25 extend diagonally upward to the rear of the cassette cover 2 and to the left and right. The cassette cover 2 is configured to be removably attached to the lower side of the main body 3. An outer edge 23 of the cassette cover 2 corresponds to an edge portion 36 of the main body 3.

Figure 3:
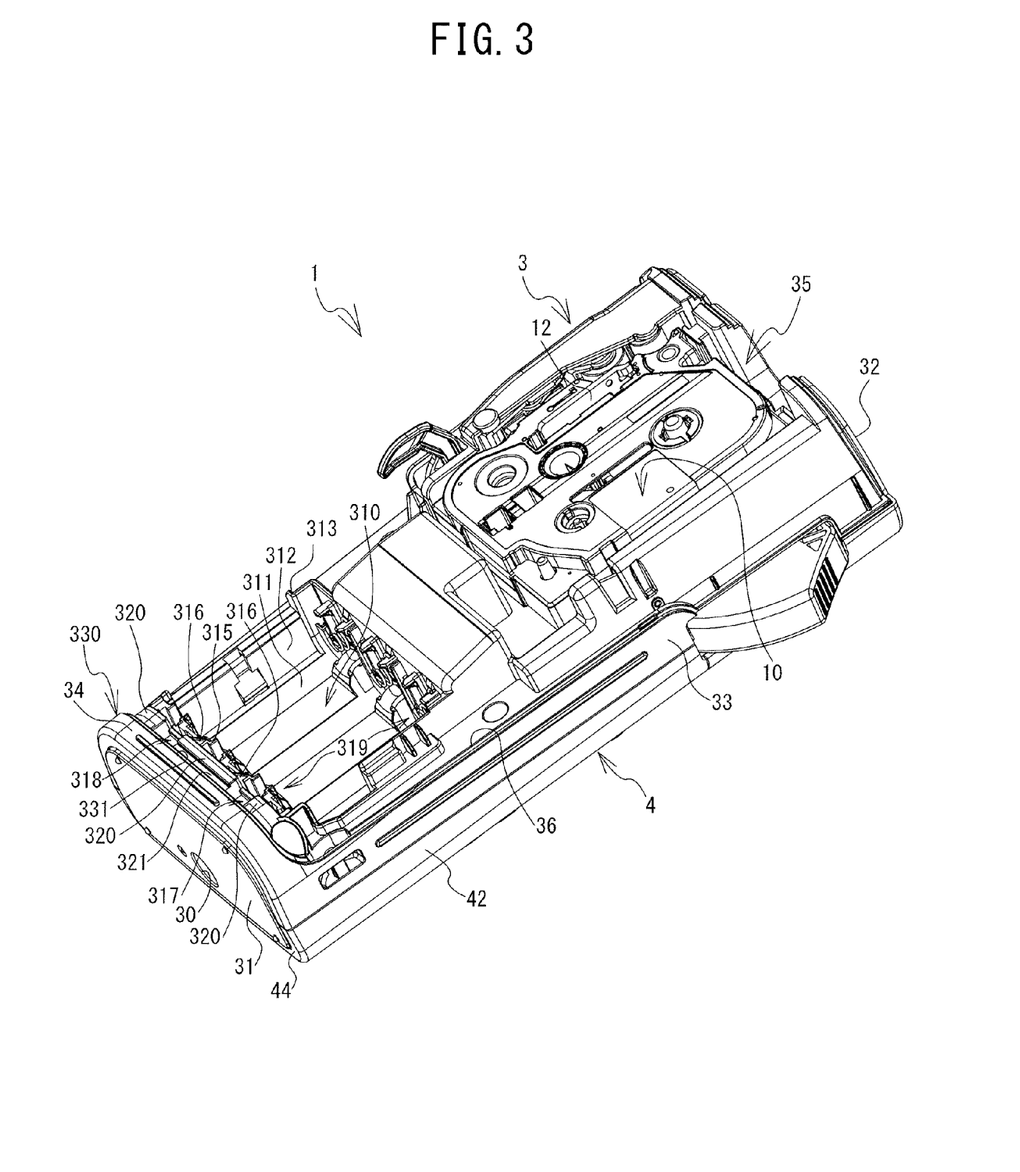
FIG. 3 is a perspective view of the printer as seen from below, with a cassette cover removed.
Figure 5:
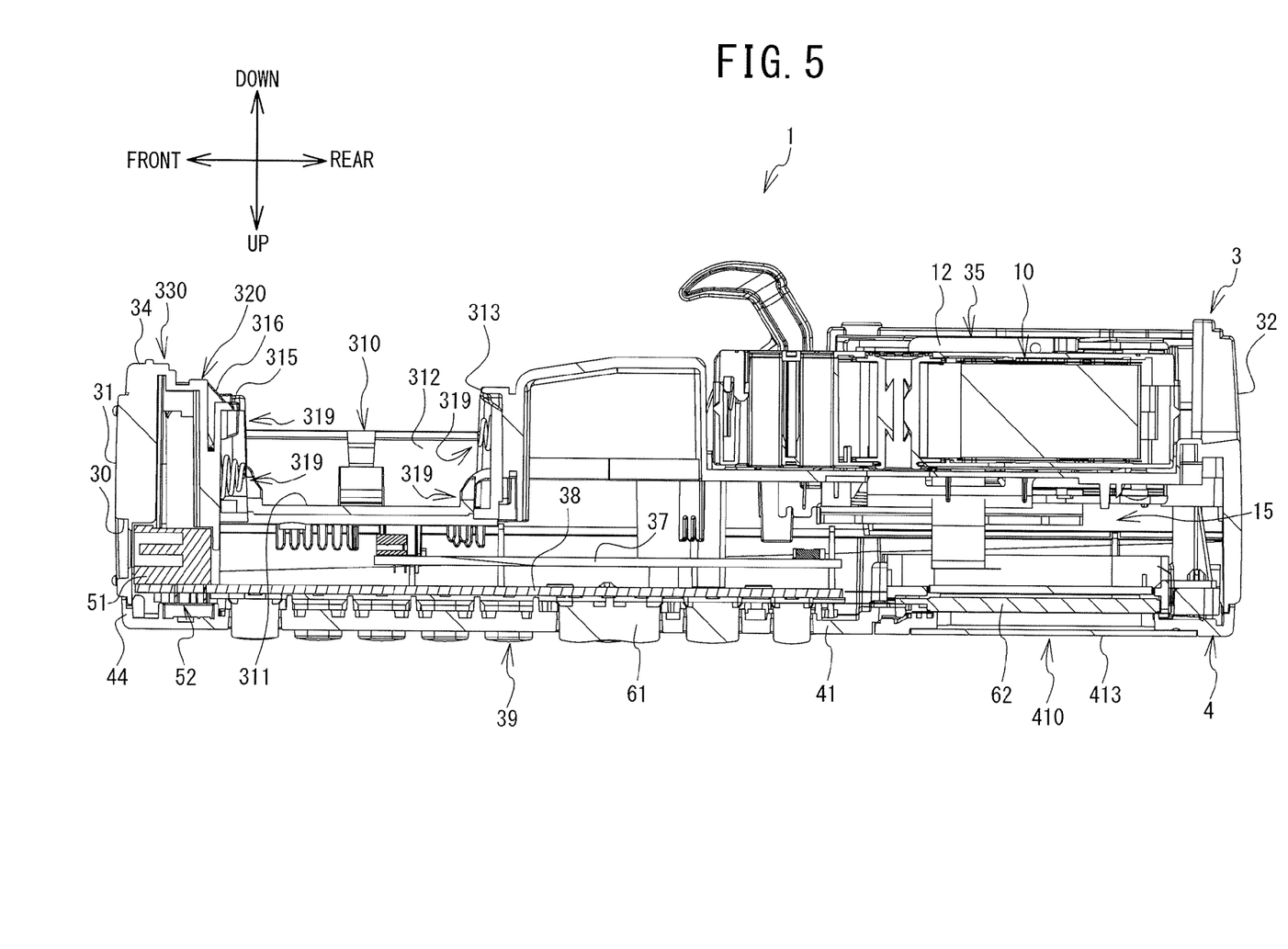
FIG. 5 is a cross-sectional view as seen along a line V-V in the direction of arrows shown in FIG. 4.

As shown in FIG. 3 to FIG. 5, the main body 3 includes a cassette storage portion 35, a battery storage portion 310, various mechanisms, boards 37 and 38 on which control circuits are mounted, and other electronic components. The cassette storage portion 35 is configured to house the tape cassette 10. The battery storage portion 310 is configured to house batteries. The various mechanisms are configured to perform printing on the tape while feeding the tape. The external shape of the main body 3 is defined by a front surface 31, a back surface 32, a pair of right and left side surfaces 33 and a bottom surface 34. The bottom surface 34 is only provided on the front end portion of the main body 3. The side surfaces 33 are surfaces that are formed continuously from the front surface 31 and the bottom surface 34. To the rear of a range in which the bottom surface 34 is provided, the height of the side surfaces 33 gradually becomes lower toward the back surface 32. The edges of the bottom surface 34, the pair of side surfaces 33 and the back surface 32 integrally form the edge portion 36 of the main body 3.

The cassette storage portion 35 is provided on the inner side of the edge portion 36 in the rear portion of the main body 3. The cassette storage portion 35 opens on the lower side of the main body 3 (on the side of the cassette cover 2). The cassette storage portion 35 is a recessed portion that is recessed upward (to the side of the top cover 4). A roller drive shaft (not shown in the drawings), a ribbon take-up shaft (not shown in the drawings) and a head holder 12 (omitted in FIG. 4) etc. are provided in the cassette storage portion 35. The roller drive shaft is configured to pull the tape from the tape cassette 10 and feed the tape. The ribbon take-up shaft is configured to pull out and take up an ink ribbon. A print head, which is configured to perform printing on the tape, is mounted on the head holder 12. A drive mechanism 15 (refer to FIG. 5) that is configured to rotationally drive the roller drive shaft and the ribbon take-up shaft is provided on the upper side of the cassette storage portion 35 (on the side of the top cover 4) inside the main body 3.

The battery storage portion 310 is provided on the inner side of the edge portion 36 in the front portion of the main body 3. The battery storage portion 310 has an opening portion 313 that opens on the lower side of the main body 3 (on the side of the cassette cover 2). The battery storage portion 310 is a recessed portion that is recessed upward (to the side of the top cover 4). The battery storage portion 310 is bounded by a bottom wall portion 311 and a peripheral wall portion 312 that surrounds the bottom wall portion 311. A portion that extends in the left-right direction at the front end portion of the peripheral wall portion 312 is referred to as a front wall portion 320.

As shown in FIG. 5, a portion of the main body 3 that is on the outer peripheral side (that is, on the front side) of the front wall portion 320 protrudes further downward than the front wall portion 320 (that is, it protrudes further to the side to which the cassette cover 2 is attached). The protruding portion that is further to the front side than the front wall portion 320 is referred to as an outer edge portion 330. In addition, a stepped portion 315 is provided on the inner side of the front wall portion 320. The stepped portion 315 is stepped lower toward the side of the bottom face portion 311 than the protruding end of the front wall portion 320. In other words, the height of the perimeter of the battery storage portion 310 becomes higher from the bottom wall portion 311 toward the front, in order of the stepped portion 315, the front wall portion 320 and the outer edge portion 330. The structure of the battery storage portion 310 and its surroundings will be described in more detail later.

The boards 37 and 38, on which are mounted control circuits that are configured to control the operation of the printer 1, are provided above the cassette storage portion 35 and the battery storage portion 310 inside the main body 3 (on the side of the top cover 4). The board 37 extends in a central portion of the main body 3 substantially in parallel with the top cover 4. The board 38 is disposed above the board 37 (on the side of the top cover 4) and extends from the front end portion toward the central portion of the main body 3, substantially in parallel with the top cover 4. A rubber keypad 61 that forms the plurality of keys of the operation portion 39 is provided between the board 38 and the top cover 4. A liquid crystal display 62 of the display portion 410 is provided to the rear of the board 38.

The printer 1 includes a power jack 51 that is configured to be connected to a connector of an AC adaptor, such that a power supply can also be accessed via the AC adaptor in addition to the battery. The power jack 51 is disposed below the board 38 (on the side opposite to the top cover 4) in the front end portion of the main body 3. The connector of the AC adaptor may be connected to the power jack 51 through an opening 30 that is provided in the front surface 31. Terminals 52 of the power jack 51 protrude upward from the board 38, that is, protrude to the side of the top cover 4.

Figure 6:
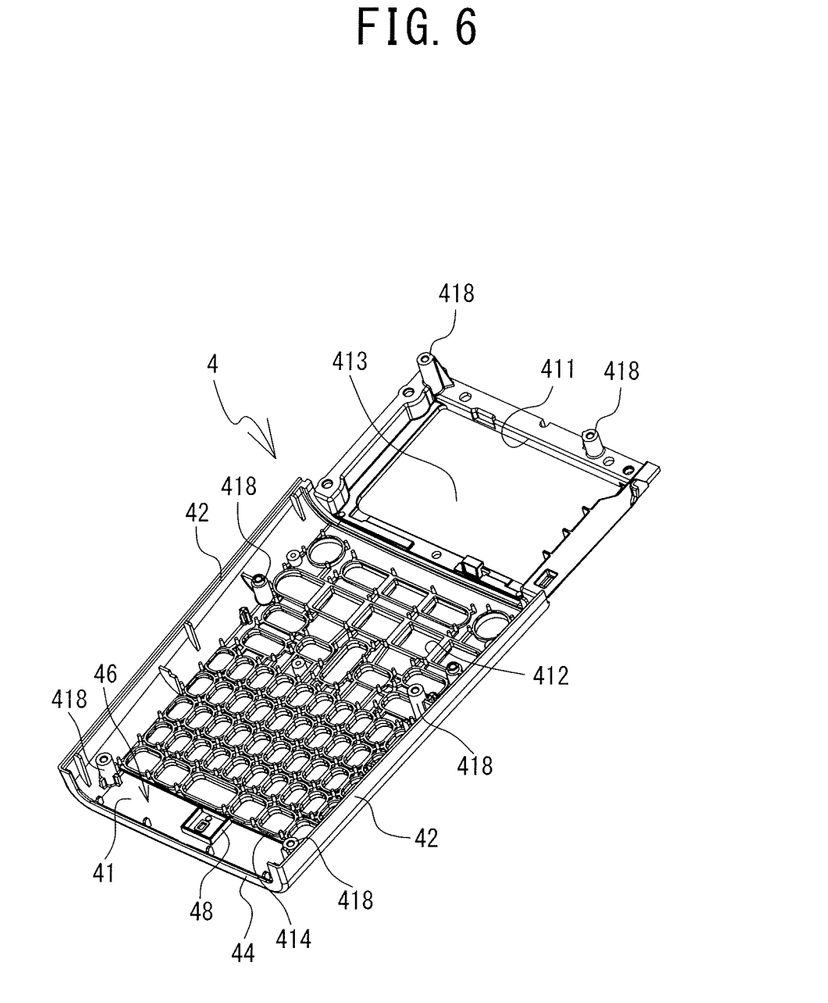
FIG. 6 is a perspective view of an inner surface side of a top cover that is removed from a main body.

As shown in FIG. 6, the top cover 4 is a thin plate-shaped member and includes a top plate portion 41, a pair of side plate portions 42 and a front plate portion 44. The top plate portion 41 is a substantially rectangular shape that is longer in the front-rear direction. The side plate portions 42 extend downward (to the side of the main body 3) from the right and left end portions of the top plate 41, respectively, and are slightly curved. The front plate portion 44 protrudes slightly downward from the front end portion of the top plate portion 41. An opening 411 is formed in the rear portion of the top plate portion 41, in a position corresponding to the liquid crystal display 62 of the main body 3. A transparent plastic protective plate 413 is fitted into the opening 411. The side plate portions 42 extend from the front end portion to the front of the opening 411.

Further to the front than the opening 411, the top plate portion 41 is provided with a plurality of key openings 412 that correspond to the plurality of keys formed on the rubber 61 keypad of the main body 3. When the top cover 4 is attached to the main body 3, the plurality of keys protrude slightly upward from the key openings 412, respectively (refer to FIG. 5). A rib 414 is provided on the front end of an area in which the plurality of key openings 412 are provided. The rib 414 protrudes slightly downward (to the side of the main body 3) from the bottom surface of the top plate portion 41. Thus, a recessed portion 46, which is bounded by the rib 414, the front end portion of the pair of side plate portions 42 and the front plate portion 44, is formed on the front end portion of the top cover 4. A rib 48, which has a rectangular frame shape in a bottom view, is disposed in a central portion of the recessed portion 46 in the left-right direction. The rib 48 protrudes slightly downward (to the side of the main body 3) from the top plate portion 41.

Cylindrically-shaped engagement portions 418 are provided in a plurality of locations in the vicinity of the outer edge of the top plate portion 41. The top cover 4 is fixed to the main body 3 by pins (not shown in the drawings) that protrude upward from the main body 3 being inserted into hole portions in the engagement portions 418.

Figure 7:
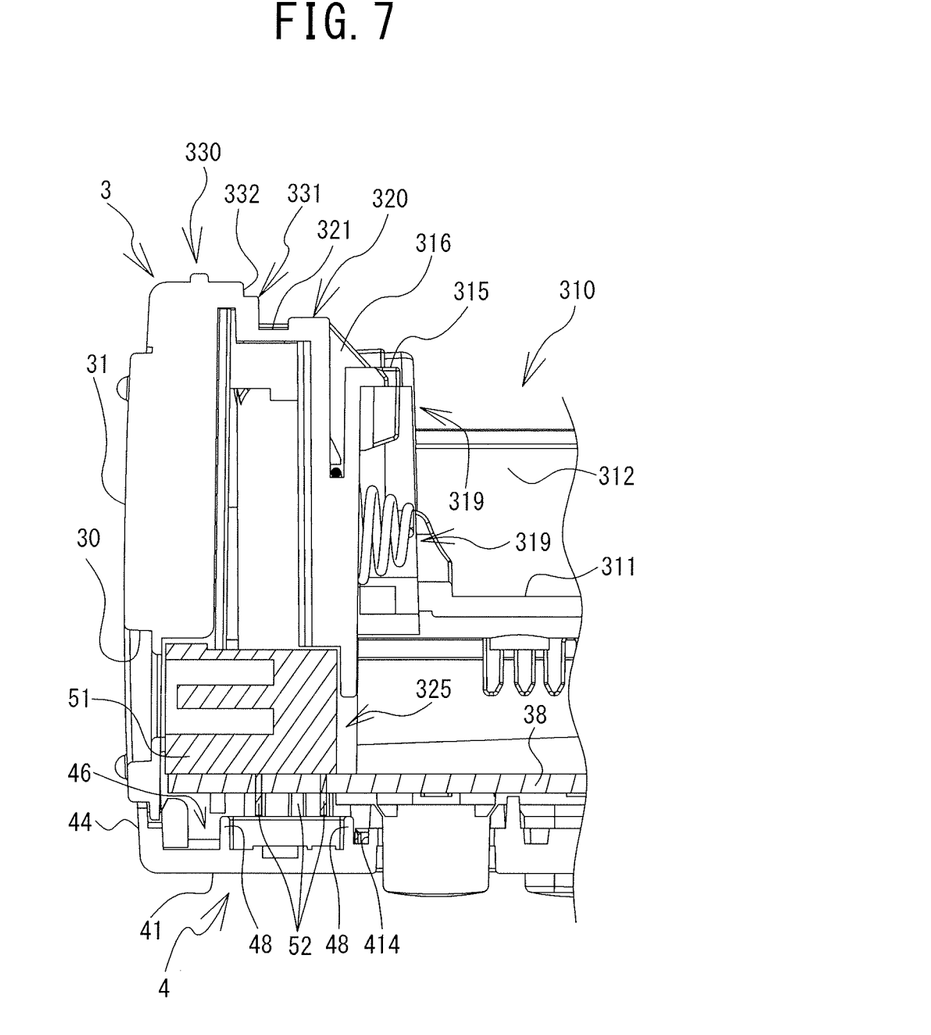
FIG. 7 is a partial expanded view of an area around the front end only of the printer shown in FIG. 5.

Hereinafter, the detailed structure of the battery storage portion 310 and its surroundings will be explained with reference to FIG. 3, FIG. 4 and FIG. 7. As shown in FIG. 3 and FIG. 4, the battery storage portion 310 is provided with six pairs of terminals 319, on the inner surfaces of the peripheral wall portion 312 that oppose to each other in the front-rear direction. Each pair includes one front and rear pair of the terminals 319 corresponding to the positive electrode and the negative electrode of the battery. In other words, the battery storage portion 310 is configured to house six batteries. As shown in FIG. 7, a top end portion of the above-described stepped portion 315 is a top end portion of a support portion that is configured to support the terminals 319.

As shown in FIG. 7, a stepped portion 331 is provided along the top end of the outer edge portion 330 on the side of the front wall portion 320. The stepped portion 331 has an inner surface 332 that extends in the height direction of the front wall portion 320, namely, in the up-down direction. The inner surface 332 corresponds to the edge of the bottom surface 34. The cassette cover 2 may be attached to the main body 3 in a state in which the outer edge 23 of the cassette cover 2 is fitted inside the edge portion 36 of the main body 3 (refer to FIG. 2). A front end edge 22 of the cassette cover 2 engages with the stepped portion 331, and the outer peripheral surface of the cassette cover 2 comes into contact with the inner surface 332. In other words, in the front end portion of the printer 1, the contact surfaces of the cassette cover 2 and the main body 3 extend in the up-down direction. On the other hand, in sections other than the front end portion of the printer 1, namely, in the sections in which the outer peripheral surface of the cassette cover 2 comes into contact with the edges of the pair of side surfaces 33 and of the back surface 32, the contact surfaces of the cassette cover 2 and the main body 3 extend in the horizontal direction.

As shown in FIG. 3 and FIG. 4, the front wall portion 320 is a wall portion having a thickness in the front-rear direction and extends the full length of the battery storage portion 310 in the left-right direction. The front wall portion 320 has hole portions 317 and 318. The hole portion 317 is formed between a center position in the left-right direction and the left end of the front wall portion 320. The hole portion 318 is formed between the center position in the left-right direction and the right end of the front wall portion 320. The hole portions 317 and 318 both have a rectangular shape in a bottom view, and both are open on the lower end portion of the front wall portion 320 (that is, on the protruding end portion of the front wall portion 320 that faces the cassette cover 2).

The hole portions 317 and 318 are disposed in positions that are separated from the battery storage portion 310. In other words, the hole portions 317 and 318 are not connected to the inner surface of the front wall portion 320 (that is, the surface that faces toward the interior of the battery storage portion 310). Sections of the front wall portion 320 are respectively interposed between the hole portion 317 and the battery storage portion 310, and between the hole portion 318 and the battery storage portion 310. Of the front wall portion 320, the section between the hole portion 317 and the battery storage portion 310 and the section between the hole portion 318 and the battery storage portion 310 are lower toward the bottom surface portion 311 side than other sections.

Each of the hole portions 317 and 318 extends upward (to the side on which the top cover 4 is mounted) on the inside of the front wall portion 320 from the opening on the protruding end portion of the front wall portion 320, and each communicates with the space inside the recessed portion 46 of the top cover 4 that is mounted on the main body 3. The hole portions 317 and 318 need not necessarily extend in a straight line, but the hole portions 317 and 318 at least partly extend along the height direction of the front wall portion 320 and their perimeter is defined by the walls.

A groove portion 321 is formed between the hole portions 317 and 318 in the left-right direction of the front wall portion 320. The groove portion 321 is a portion in which approximately half of the front side of the front wall portion 320 is recessed to the side of the bottom wall portion 311. The left end and the right end of the groove portion 321 connect to the right end of the hole portion 317 and the left end of the hole portion 318, respectively. In this manner, the groove portion 321 communicates with the hole portions 317 and 318 and is formed, in the thickness direction of the front wall portion 320, in a position separated from the edge on the side of the battery storage portion 310 to the side of the outer edge portion 330.

As shown in FIG. 4, the bottom surface portion 311 has a hole portion 325, which opens on the protruding end portion of the stepped portion 315, on the rear side of the central portion, in the left-right direction, of the front wall portion 320. The hole portion 325 extends upward (to the side of the top cover 4) from the opening and communicates with the storage space of the power jack 51, as shown in FIG. 7. Ribs 316, which have a right-angled triangular shape in a side view, are provided, respectively, on the protruding end portions of the stepped portion 315 on the left and right of the hole portion 325. In other words, a pair of the ribs 316 are provided on both sides of the hole portion 325, in a direction that is orthogonal to the height direction and the thickness direction of the front wall portion 320. The ribs 316 link the protruding end portion of the front wall portion 320 and the protruding end portion of the stepped portion 315.

As shown in FIG. 7, in the front end portion of the main body 3, the three terminals 52 of the power jack 51 protrude upward (to the side of the top cover 4) from the board 38. An area facing the three terminals 52 is surrounded, on the top plate portion 41 of the top cover 4, by the rib 48 that protrudes in a rectangular frame shape downward (to the side of the main body 3) from the top plate portion 41.

Hereinafter, the splash-proof effects of the above-described structures will be explained. When inputting characters or causing printing to be performed etc., the user of the printer 1 may cause the operation portion 39 and the display portion 410 to face upward, as shown in FIG. 1, and use the printer 1 in the upward facing posture. On the other hand, when inserting or removing the tape cassette 10 or the battery etc., the user may cause the cassette cover 2 to face upward, as shown in FIG. 2 and FIG. 3, and use the printer 1 in the downward facing posture. That is, the user can use the printer 1 in the two types of posture. Thus, when the user places the printer 1 on a desktop etc. after use, there may be cases in which the printer 1 is placed in the upward facing posture and cases in which the printer 1 is placed in the downward facing posture. As shown in FIG. 5, although the plurality of keys of the operation portion 39 protrude from the top cover 4, as the amount of protrusion is the same and is also slight, the printer 1 can be placed in a stable manner even in the downward facing posture.

When the user mistakenly spills a drink or the like, or due to another cause, liquid may be spilled from above on the printer 1 that has been placed in the downward facing posture. In this type of case, the liquid that falls on the cassette cover 2 that is disposed on the upper side may flow downward. As described above, the contact surfaces of the cassette cover 2 and the main body 3 extend in the up-down direction only in the section in which the front end edge 22 of the cassette cover 2 is fitted with the edge of the bottom surface 34 of the main body 3. It is thus possible that the liquid may enter into the side of the main body 3 through the slight gap between the front end edge 22 and the edge (more specifically, the inner surface 332 of the stepped portion 331) of the bottom surface 34.

The liquid may slip down from the inner surface 332 toward the front wall portion 320 via the stepped portion 331. As shown in FIG. 7, the front wall portion 320 has the groove portion 321 that is formed on the side of the stepped portion 331. The liquid may thus gather in the groove portion 321 and therefore may not flow to the battery storage portion 310. Furthermore, as shown in FIG. 4, the hole portions 317 and 318 are formed to the left and the right of the groove portion 321. The liquid that has gathered inside the groove portion 321 may thus flow into the hole portions 317 and 318 without flowing over the front wall portion 320 to the side of the battery storage portion 310. In this manner, the printer 1 may proactively limit a movement path of the liquid using the groove portion 321 and the hole portions 317 and 318 provided in the front wall portion 320 that defines the battery storage portion 310. With this simple structure, it is possible to inhibit liquid from entering into the battery storage portion 310 that is provided with the terminals 319 for the battery, without providing a component that is separate to the battery storage portion 310, such as packing etc.

As described above, the hole portions 317 and 318 communicate with the space inside the recessed portion 46 of the top cover 4. Therefore, the liquid may slip down along the walls surrounding the hole portions 317 and 318, and gather in the recessed portion 46. The terminals 52 of the power jack 51 are disposed in the recessed portion 46. However, the rib 48 that protrudes from the recessed portion 46 to the side of the main body 3 surrounds the area facing the terminals 52. Therefore, the rib 48 can inhibit the liquid from entering into that area. Thus, the rib 48 can inhibit the liquid that has gathered in the recessed portion 46 from attaching to the terminals 52.

Further, the hole portion 325, which communicates with the storage space of the power jack 51, is formed to the rear side of the front wall portion 320. However, the ribs 316, which link the upper end portion of the front wall portion 320 and the upper end portion of the stepped portion 315, that are provided on the left and right of the hole portion 325 can inhibit the liquid from entering into the hole portion 325 from the hole portions 317 and 318. The ribs 316 can thus inhibit the liquid that slips down downward from the hole portion 325 from attaching to the power jack 51.

Various modifications to the above-described embodiment are possible. For example, the hole portions 317 and 318 need not necessarily extend along the height direction of the front wall portion 320 and their perimeter need not necessarily be bounded by walls. Further, the hole portions 317 and 318 need not necessarily communicate with the space inside the recessed portion 46 of the top cover 4. For example, the hole portions 317 and 318 may be bottomed holes of a size that can retain a certain amount of liquid. The hole portions 317 and 318 may be hole portions that extend to and communicate with openings provided in the front surface 31 of the main body 3.

In order to cause the liquid to flow efficiently into the hole portion 317 and the hole portion 318, the groove portion 321 may be tilted toward the side of the top cover 4, from the center toward the hole portion 317 and toward the hole portion 318. The hole portions 317 and 318 that communicate with the groove portion 321 need not necessarily be provided as two holes, and only one of the hole portions 317 and 318 may be provided. Three or more hole portions that communicate with a groove portion may be provided on the front wall portion 320. Groove portions similar to the groove portion 321 may also be formed on the front wall portion 320 on a section to the left side of the hole portion 317 and on a section to the right side of the hole portion 318. In these cases also, the groove portions may be tilted toward the hole portions.

In a case where no component (an electric component, in particular) to be protected from liquid is disposed in the recessed portion 46, the rib 48 need not necessarily be provided. The arrangement position and the shape of the rib 48 may be changed as appropriate depending on the arrangement position, the shape and the size of the component. Furthermore, the shape, position and size of the recessed portion 46 can also be changed as appropriate. For example, the recessed portion 46 need not necessarily be formed by the top cover 4, and may be a recessed portion that is connected to the hole portion 317 and the hole portion 318 inside the main body 3 and that is bounded by a bottom wall portion and a peripheral wall portion, the bottom wall portion stretching in a direction orthogonal to a direction in which the hole portion 317 and the hole portion 318 extends.

Further, as described above, the liquid can be inhibited from entering in the direction of the battery storage portion 310 by the groove portion 321 and the hole portions 317 and 318. Therefore, and therefore the ribs 316 need not necessarily be disposed on both sides of the hole portion 325.

The groove portion 321 and the hole portions 317 and 318 may be applied to another portion of the peripheral wall portion 312 of the battery storage portion 310, and may be applied to another recessed portion in which an object other than a battery is housed. For example, the groove portion 321 and the hole portions 317 and 318 can be applied to a recessed portion that is configured to house an electronic component, or to a recessed portion that is provided with an electronic component, which have a great need to be protected from liquid. In addition, the groove portion 321 and the hole portions 317 and 318 may be applied to a storage container simply having a storage function, and not to an electronic device such as the printer 1. When an outer peripheral surface of a cover that is configured to close an opening of a recessed portion comes into contact, on the outer peripheral side of a peripheral wall portion that defines the recessed portion, with an inner surface that extends in the height direction of the peripheral wall portion, it is sufficient if a groove portion and a hole portion are provided in at least in a portion of the peripheral wall portion, depending on a position of contact.

For example, in a case where the cassette cover 2 has a rectangular plate shape and is configured such that the contact surfaces of the edge portion of the main body 3 and the outer peripheral surface of the cassette cover 2 extend in the up-down direction, when liquid falls on the printer 1 in the downward facing posture, there is a possibility that the liquid may enter into other portions of the main body 3. Therefore, for example, a groove portion and at least one hole portion may be provided in the right wall portion and the left wall portion of the peripheral wall portion 312 of the battery storage portion 310. In addition, for example, a groove portion and at least one hole portion may be provided in the rear wall portion of the peripheral wall portion that defines the cassette storage portion 35.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A storage container comprising:
a main body having a first recessed portion and an outer edge portion, the first recessed portion having an opening portion and being bounded by a first bottom surface portion and a first peripheral wall portion, the first peripheral wall portion including a first wall portion, the outer edge portion protruding further than the first wall portion on an outer periphery side of the storage container with respect to the first wall portion and having an inner surface that extends in a height direction of the first wall portion, the first wall portion having a groove portion and at least one first hole portion, the groove portion being formed on a protruding end portion of the first wall portion in a position that is separated from an edge of the first recessed portion toward the outer edge portion in a thickness direction of the first wall portion, and the at least one first hole portion opening onto the protruding end portion, communicating with the groove portion and being provided in a position that is separated from the first recessed portion, the main body further including:
   a second recessed portion that is formed inside the main body and that is a space with which the at least one first hole portion communicates, the second recessed portion being bounded by a second bottom wall portion and a second peripheral wall portion, and the second bottom wall portion extending in a direction orthogonal to the direction in which the at least one first hole portion extends;
   a component, at least a part of which is disposed in the second recessed portion; and
   a first rib that is disposed around a perimeter of an area that faces at least the part of the component, on the second bottom wall portion; and
a cover that is configured to be removably attached to the main body, and that is configured to close the opening portion of the first recessed portion in a state in which a portion of an outer peripheral surface of the cover comes into contact with the inner surface of the outer edge portion of the main body.

2. The storage container according to claim 1, wherein the at least one first hole portion extends along the height direction of the first wall portion and a perimeter of the at least one first hole portion is bounded by walls.

3. The storage container according to claim 1, wherein the first recessed portion is provided with an electronic component.

4. The storage container according to claim 3, wherein the first recessed portion is provided with terminals for a battery, as the electronic component.

5. The storage container according to claim 1, wherein the component is an electronic component.

6. The storage container according to claim 1, wherein the first recessed portion includes:
   a stepped portion that is provided on an inner side of the first wall portion;
   a second hole portion that is provided along the first wall portion and that opens onto a protruding end portion of the stepped portion; and
   second ribs that are provided on both sides of the second hole portion in a direction orthogonal to the height direction and to a width direction of the first wall portion and that connect the protruding end portion of the stepped portion and the protruding end portion of the first wall portion.

7. A storage container comprising:
a main body having a first recessed portion and an outer edge portion, the first recessed portion having an opening portion and being bounded by a first bottom surface portion and a first peripheral wall portion, the first peripheral wall portion including a first wall portion, the outer edge portion protruding further than the first wall portion on an outer periphery side of the storage container with respect to the first wall portion and having an inner surface that extends in a height direction of the first wall portion, the first wall portion having a groove portion and at least one first hole portion, the groove portion being formed on a protruding end portion of the first wall portion in a position that is separated from an edge of the first recessed portion toward the outer edge portion in a thickness direction of the first wall portion, and the at least one first hole portion opening onto the protruding end portion, communicating with the groove portion and being provided in a position that is separated from the first recessed portion; and
a cover that is configured to be removably attached to the main body, and that is configured to close the opening portion of the first recessed portion in a state in which a portion of an outer peripheral surface of the cover comes into contact with the inner surface of the outer edge portion of the main body,
wherein the first recessed portion of the main body further includes:
   a stepped portion that is provided on an inner side of the first wall portion;
   a second hole portion that is provided along the first wall portion and that opens onto a protruding end portion of the stepped portion; and
   second ribs that are provided on both sides of the second hole portion in a direction orthogonal to the height direction and to a width direction of the first wall portion and that connect the protruding end portion of the stepped portion and the protruding end portion of the first wall portion.

* * * * *